(12) United States Patent
Nakamura et al.

(10) Patent No.: US 10,523,469 B2
(45) Date of Patent: Dec. 31, 2019

(54) RELAY DEVICE AND COMMUNICATION SYSTEM

(71) Applicant: MINEBEA MITSUMI Inc., Nagano (JP)

(72) Inventors: Yoshihiro Nakamura, Fukuroi (JP); Kohei Nishibori, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/810,311

(22) Filed: Nov. 13, 2017

(65) Prior Publication Data

US 2018/0152323 A1    May 31, 2018

(30) Foreign Application Priority Data

Nov. 25, 2016  (JP) .................................. 2016-229197

(51) Int. Cl.
*H04L 12/66* (2006.01)
*H04L 12/24* (2006.01)
*H04L 12/70* (2013.01)

(52) U.S. Cl.
CPC .............. *H04L 12/66* (2013.01); *H04L 41/50* (2013.01); *H04L 2012/5618* (2013.01)

(58) Field of Classification Search
None
See application file for complete search history.

(56) References Cited

U.S. PATENT DOCUMENTS

| 2006/0013128 A1* | 1/2006 | Connor ............... H04L 41/0896 370/229 |
| 2016/0036918 A1* | 2/2016 | Lee ....................... H04L 67/322 370/230 |

FOREIGN PATENT DOCUMENTS

| JP | 2014-192661 A | 10/2014 |
| JP | 2015-070573 A | 4/2015 |

OTHER PUBLICATIONS

Notification of Reasons for Refusal dated Apr. 2, 2019 for corresponding Japanese Application No. 2016-229197 and English translation.

* cited by examiner

*Primary Examiner* — Christine T Duong
(74) *Attorney, Agent, or Firm* — Pearne & Gordon LLP

(57) ABSTRACT

A relay device according to an embodiment includes a communication unit that receives information, transmitted from a plurality of communication terminals, and transmits the received information to a server; and a deriving unit that, in accordance with the total number of pieces of information received by the communication unit between a first point and a second point that elapses a predetermined time period, derives the timing information related to the transmission timing of information transmitted after the second point by at least one communication terminal among the communication terminals, and the communication unit transmits the timing information to the at least one communication terminal.

6 Claims, 8 Drawing Sheets

| TRAFFIC LEVEL | TRANSMISSION MASK PERIOD |
|---|---|
| 1 | 1 |
| 2 | 5 |
| 3 | 20 |
| 4 | 40 |
| 5 | 60 |

| TOTAL NUMBER OF PIECES OF SENSOR | TRAFFIC LEVEL |
|---|---|
| 0 TO 5 | 1 |
| 5 TO 10 | 2 |
| 10 TO 15 | 3 |
| 15 TO 20 | 4 |
| FROM 20 | 5 |

RELAY DEVICE AND COMMUNICATION SYSTEM

CROSS-REFERENCE TO RELATED APPLICATION(S)

The present application claims priority to and incorporates by reference the entire contents of Japanese Patent Application No. 2016-229197 filed in Japan on Nov. 25, 2016.

BACKGROUND OF THE INVENTION

1. Field of the Invention

The present invention relates to a relay device and a communication system.

2. Description of the Related Art

Conventionally, there is a known communication system that transmits sensor information collected by a plurality of communication terminals equipped with a sensor installed in a sensor network to a server via a relay apparatus that relays the network, thereby causing the server to aggregate the sensor information. An exemplary relay apparatus of this includes a relay apparatus including a database that accumulates and stores, for each transmission destination, a packet to which accumulation information is attached transmitted from a node, a timer management unit that manages intervals of transmitting the packet accumulated and stored in the database to a server, and a communication unit that transmits the packet to the server at this interval (refer to JP 2014-192661 A, for example).

With the communication system described in JP 2014-192661 A, it is possible to alleviate the load on the server generated in communication between the relay apparatus and the server. In a case, however, where sensor information is transmitted from a communication terminal to a relay apparatus in the communication system described in JP 2014-192661 A, executing transmission of the sensor information to the relay apparatus simultaneously by a plurality of communication terminals would increase the load on the relay apparatus. This hinders proper reception of the sensor information by the relay apparatus due to generation of collision, buffer overflow, or the like, and delays transmission of an acknowledgment (ACK), or the like, by the relay apparatus to the plurality of communication terminals in some cases. This deteriorates reliability of the communication between the communication terminal and the relay apparatus, increasing communication volume and degrading the real-time performance.

SUMMARY OF THE INVENTION

A relay device according to one embodiment of the present invention includes a communication unit that receives information, transmitted from a plurality of communication terminals, and transmits the received information to a server; and a deriving unit that, in accordance with the total number of pieces of information received by the communication unit between a first point and a second point that elapses a predetermined time period, derives the timing information related to the transmission timing of information transmitted after the second point by at least one communication terminal among the communication terminals, and the communication unit transmits the timing information to the at least one communication terminal.

DETAILED DESCRIPTION OF THE PREFERRED EMBODIMENTS

Figure 1:
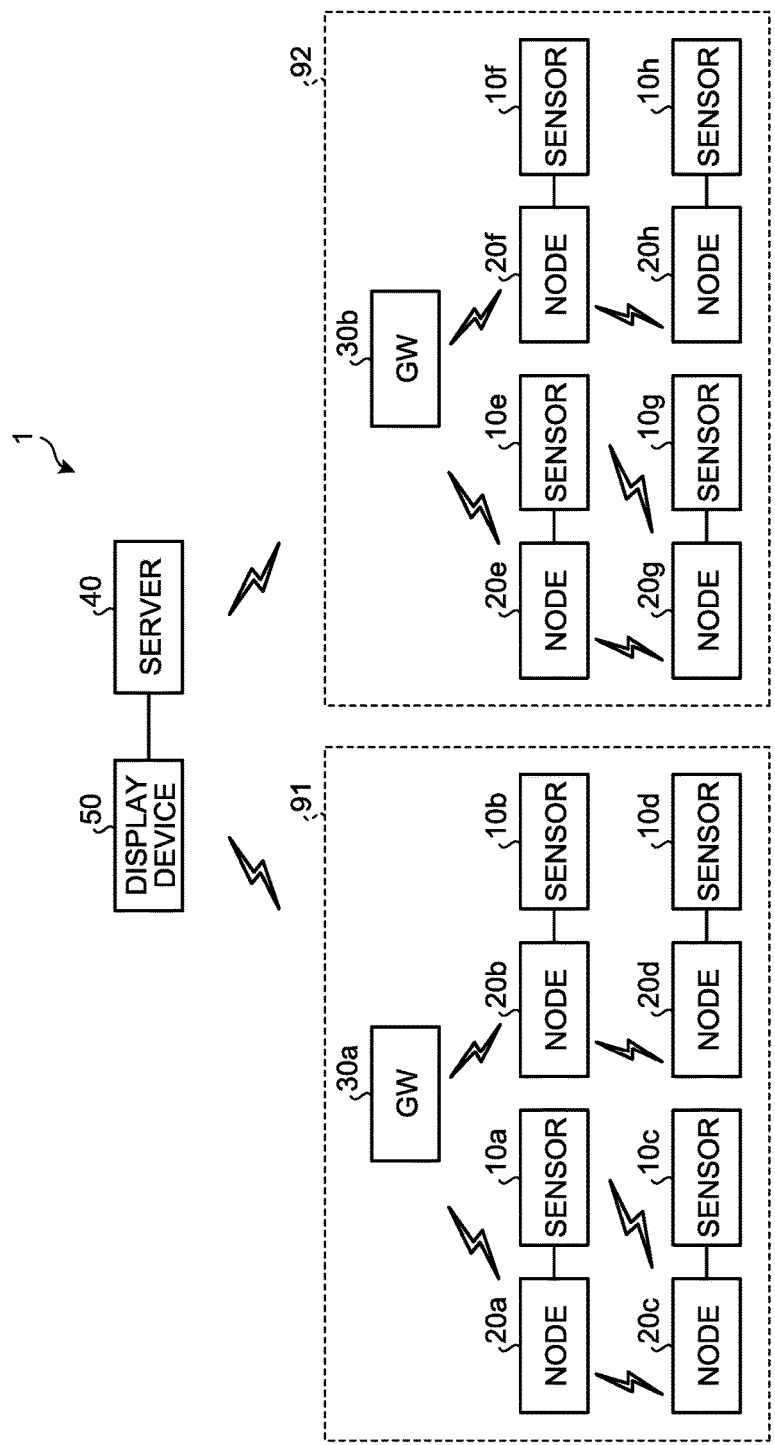
FIG. 1 is a diagram that illustrates an example of the configuration of a communication system according to an embodiment.

With reference to the drawings, an explanation is given below of a communication terminal and a communication system according to an embodiment. FIG. 1 is a diagram that illustrates an example of the configuration of a communication system 1 according to the embodiment.

As illustrated in FIG. 1, the communication system 1 according to the embodiment includes eight sensors 10a to 10h, eight nodes (communication terminals) 20a to 20h, two gateways (GWs (relay devices)) 30a, 30b, a server 40, and a display device 50. In the following explanation, the sensors 10a to 10h are collectively mentioned as a sensor 10 if they are not distinctively explained, the nodes 20a to 20h are collectively mentioned as a node 20 if they are not distinctively explained, and the GWs 30a, 30b are collectively mentioned as a GW 30 if they are not distinctively explained.

Furthermore, the number of the GWs 30 is not always two, but it may be one or more than three. Moreover, any number of the nodes 20 may be directly or indirectly connected to each of the GWs 30 as long as there are multiple ones.

For example, the communication system 1 is provided in a factory where multiple working machines are installed. Furthermore, in the communication system 1, the sensor 10 detects the state of a working machine, the node 20 transmits the sensor information (also referred to as the state information), which indicates the state of the working machine detected by the sensor 10, to the server 40 via the GW 30, and the server 40 collects the sensor information. Here, the sensor information is information that indicates for example any of the state (normal state) where a working machine operates in a normal way and the state (abnormal state) where the operation of a working machine is abnormal. Moreover, the server 40 causes the display device 50 to display the state of the working machine, indicated by the collected sensor information. In this way, the communication system 1 allows a user, such as a supervisor of the factory, to know the states of working machines.

The sensor 10 is connected to the node 20, and it is attached to a working machine. The sensor 10 detects the state of the working machine at an interval of a predetermined time period (e.g., 5 seconds) and notifies the detected state to the node 20. For example, in order to detect the states of all the working machines, the sensors 10 are attached to working machines, respectively, and they detect the states of the working machines.

For example, the sensors 10a to 10h are attached to different working machines. The sensor 10a is connected to the node 20a, and it notifies the state of the working machine to the node 20a at a predetermined time interval. The sensor 10b is connected to the node 20b, and it notifies the state of the working machine to the node 20b at a predetermined time interval. The sensor 10c is connected to the node 20c, and it notifies the state of the working machine to the node 20c at a predetermined time interval. The sensor 10d is connected to the node 20d, and it notifies the state of the working machine to the node 20d at a predetermined time interval. The sensor 10e is connected to the node 20e, and it notifies the state of the working machine to the node 20e at a predetermined time interval. The sensor 10f is connected to the node 20f, and it notifies the state of the working machine to the node 20f at a predetermined time interval. The sensor 10g is connected to the node 20g, and it notifies the state of the working machine to the node 20g at a predetermined time interval. The sensor 10h is connected to the node 20h, and it notifies the state of the working machine to the node 20h at a predetermined time interval.

The sensor 10 is for example a temperature sensor. If the sensor 10 is a temperature sensor, the sensor 10 detects the temperature of a working machine and notifies the detected temperature to the node 20. Furthermore, if the temperature of the working machine, detected by the sensor 10, falls within the range (normal-temperature range) of temperatures in a case where the state of the working machine is a normal state, the node 20 determines that the working machine is in the normal state. Conversely, if the temperature of the working machine, detected by the sensor 10, does not fall within the normal-temperature range, the node 20 determines that the working machine is in an abnormal state.

If the state of the working machine, notified by the sensor 10, is changed, the node 20 generates the sensor information that indicates the changed state and transmits it to the GW 30. For example, if the state of the working machine is changed from the normal state to the abnormal state, the node 20 transmits the sensor information, which indicates the changed abnormal state, to the GW 30. Furthermore, if the state of the working machine is changed from the abnormal state to the normal state, the node 20 transmits the sensor information, which indicates the changed normal state, to the GW 30.

Here, the nodes 20a to 20d and the GW 30a form a mesh network 91, and the nodes 20e to 20h and the GW 30b form a mesh network 92.

For example, among the nodes 20a to 20d, the node 20a and the node 20b are capable of directly performing wireless communications with the GW 30a, the node 20c is capable of indirectly performing wireless communications with the GW 30a via the node 20a or the node 20b, and the node 20d is capable of indirectly performing wireless communications with the GW 30a via the node 20b.

Therefore, the node 20a and the node 20b directly transmit the sensor information to the GW 30a, the node 20c transmits the sensor information to the GW 30a via the node 20a or the node 20b, and the node 20d transmits the sensor information to the GW 30a via the node 20b. That is, the node 20a relays the sensor information that is generated by the node 20c. Furthermore, the node 20b relays the sensor information generated by the node 20c and the sensor information generated by the node 20d.

Furthermore, among the nodes 20e to 20h, the node 20e and the node 20f are capable of directly performing wireless communication with the GW 30b, the node 20g is capable of indirectly performing wireless communication with the GW 30b via the node 20e or the node 20f, and the node 20h is capable of indirectly performing wireless communication with the GW 30b via the node 20f.

Therefore, the node 20e and the node 20f directly transmit the sensor information to the GW 30b, the node 20g transmits the sensor information to the GW 30b via the node 20e or the node 20f, and the node 20h transmits the sensor information to the GW 30b via the node 20f. That is, the node 20e relays the sensor information that is generated by the node 20g. Furthermore, the node 20f relays the sensor information generated by the node 20g and the sensor information generated by the node 20h.

Moreover, each of the nodes 20a to 20d may be capable of directly performing wireless communication with the GW 30a, or each of the nodes 20e to 20h may be capable of directly performing wireless communication with the GW 30b.

Furthermore, the node 20 may include an undepicted revolving warning light so that it may control the color of light, generated by the revolving warning light, in accordance with the state of the working machine that is notified by the sensor 10. For example, the node 20 controls the revolving warning light so as to emit green light if the state of the working machine is the normal state, and it controls the revolving warning light so as to emit red light if it is the abnormal state.

The GW 30 is capable of performing wireless communication with the server 40 and the node 20. The GW 30 receives the sensor information, transmitted from the node 20, and transmits the received sensor information to the server 40. That is, the GW 30 relays the sensor information. Furthermore, after the GW 30 receives the sensor information, it transmits ACK to the node 20, which is the transmission source of the sensor information.

The server 40 is implemented by using, for example, a computer. After the server 40 receives the sensor information that is transmitted from the GW 30, it causes the display device 50 to display the state of the working machine, indicated by the received sensor information.

The display device 50 is implemented by using, for example, a liquid crystal display. Under the control of the server 40, the display device 50 displays the states of all the working machines in the factory. This allows users to know the states of all the working machines in the factory.

Figures 2, 3:
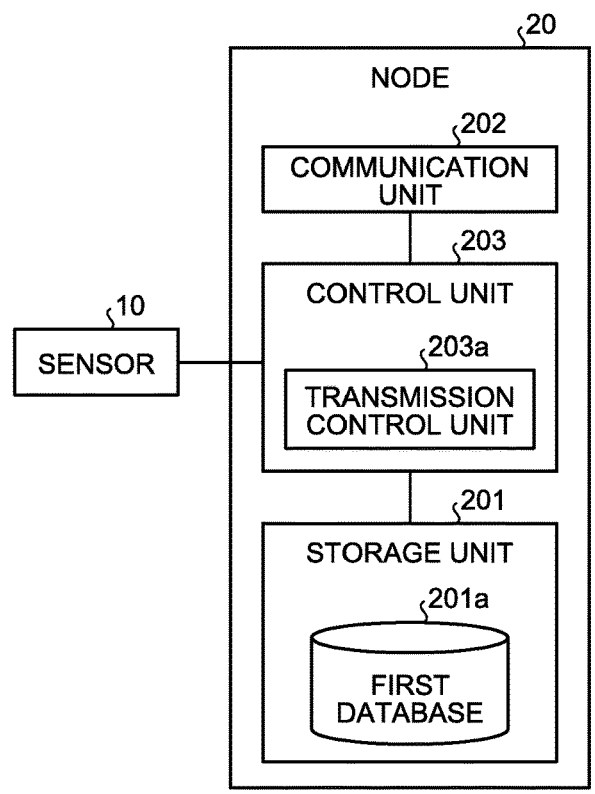
FIG. 2 is a diagram that illustrates an example of the configuration of a node according to the embodiment.
FIG. 3 is a diagram that illustrates an example of the data structure of a first database according to the embodiment.

Next, with reference to FIG. 2, an example of the configuration of the node 20 according to the embodiment is explained. FIG. 2 is a diagram that illustrates an example of the configuration of the node 20 according to the embodiment.

As illustrated in FIG. 2, the node 20 includes a storage unit 201, a communication unit 202, and a control unit 203.

The storage unit 201 is implemented by using, for example, a storage device such as a memory. The storage unit 201 stores various programs that are executed by the control unit 203. For example, the storage unit 201 stores sensor-information transmission programs to perform a sensor-information transmission process for transmitting the sensor information. Furthermore, the storage unit 201 temporarily stores various types of data that are used when the control unit 203 executes various programs.

Furthermore, the storage unit 201 according to the embodiment stores a first database 201a. The first database 201a has registered therein the traffic level, which is the level of traffic during the communication between the GW 30 and the node 20, and the transmission mask period, which indicates the wait time until the sensor information becomes transmittable after ACK is received, in a related manner. Here, the traffic level is an example of the timing information. Furthermore, the transmission mask period is a wait time after the timing (predetermined timing) in which ACK is received.

The communication unit 202 is implemented by using, for example, a network interface card (a communicator) that performs wireless communication in accordance with a standard, such as Wifi (registered trademark) or BlueTooth (registered trademark). If the communication unit 202 can perform direct communication with the GW 30, it performs wireless communication with the GW 30. Furthermore, if the communication unit 202 cannot perform direct communication with the GW 30, it performs wireless communication with the node 20 that makes a relay to the GW 30. The communication unit 202 is an example of a second communication unit.

The control unit 203 is implemented by using a processor, such as a central processing unit (CPU). The control unit 203 performs overall control of the node 20. The control unit 203 reads various programs, stored in the storage unit 201, and executes the read programs, thereby performing various processes. For example, the control unit 203 executes the sensor-information transmission program to perform the sensor-information transmission process.

As illustrated in FIG. 2, if the control unit 203, which performs the sensor-information transmission process, is illustrated functionally, the control unit 203 includes a transmission control unit 203a.

FIG. 3 is a diagram that illustrates an example of the data structure of the first database 201a according to the embodiment. As illustrated in FIG. 3, records in the first database 201a has items "traffic level" and "transmission mask period".

A traffic level is registered in the item "traffic level". For example, in the first database 201a illustrated in FIG. 3, any one of 5 traffic levels is registered. For example, the traffic level 1 indicates the smallest traffic among the 5 traffic levels. Furthermore, the traffic level 2 indicates the second smallest traffic among the 5 traffic levels. Furthermore, the traffic level 3 indicates the third smallest or largest traffic among the 5 traffic levels. Furthermore, the traffic level 4 indicates the second largest traffic among the 5 traffic levels. Moreover, the traffic level 5 indicates the largest traffic among the 5 traffic levels.

The traffic level 1 is registered in the item "traffic level" of the first record of the first database 201a illustrated in FIG. 3. Furthermore, the traffic level 2 is registered in the item "traffic level" of the second record of the first database 201a. Furthermore, the traffic level 3 is registered in the item "traffic level" of the third record of the first database 201a. Furthermore, the traffic level 4 is registered in the item "traffic level" of the fourth record of the first database 201a. Moreover, the traffic level 5 is registered in the item "traffic level" of the fifth record of the first database 201a.

A transmission mask period is registered in the item "transmission mask period". For example, 1 second is registered in the item "transmission mask period" of the first record of the first database 201a illustrated in FIG. 3. That is, in the first record of the first database 201a, the transmission mask period of 1 second is registered in relation to the traffic level 1.

Furthermore, in the item "transmission mask period" of the second record of the first database 201a, 5 seconds is registered. That is, the transmission mask period of 5 seconds is registered in the second record of the first database 201a in relation to the traffic level 2.

Furthermore, in the item "transmission mask period" of the third record of the first database 201a, 20 seconds is registered. That is, the transmission mask period of 20 seconds is registered in the third record of the first database 201a in relation to the traffic level 3.

Furthermore, in the item "transmission mask period" of the fourth record of the first database 201a, 40 seconds is registered. That is, the transmission mask period of 40 seconds is registered in the fourth record of the first database 201a in relation to the traffic level 4.

Moreover, in the item "transmission mask period" of the fifth record of the first database 201a, 60 seconds is registered. That is, the transmission mask period of 60 seconds is registered in the fifth record of the first database 201a in relation to the traffic level 5.

Here, the registered contents in the first database 201a are not limited to the contents illustrated in FIG. 3. The first database 201a only has to register each of the traffic levels and a corresponding transmission mask period.

Furthermore, the first database 201a, which has the same registered contents, may be stored in all the nodes 20, or the first database 201a, which has different registered contents, may be stored in each of the nodes 20.

Figures 4, 5:
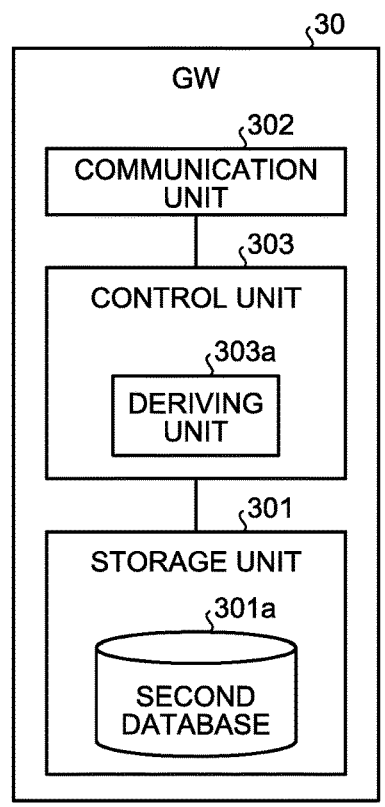
FIG. 4 is a diagram that illustrates an example of the configuration of a GW according to the embodiment.
FIG. 5 is a diagram that illustrates an example of the data structure of a second database according to the embodiment.

Next, with reference to FIG. 4, an example of the configuration of the GW 30 according to the embodiment is explained. FIG. 4 is a diagram that illustrates an example of the configuration of the GW 30 according to the embodiment.

As illustrated in FIG. 4, the GW 30 includes a storage unit 301, a communication unit 302, and a control unit 303.

The storage unit 301 is implemented by using, for example, a storage device such as a memory. The storage unit 301 stores various programs that are executed by the control unit 303. For example, the storage unit 301 stores the timing-information derivation program to perform a timing-information derivation process for deriving timing information with regard to the transmission timing of sensor information. Furthermore, the storage unit 301 temporarily stores various types of data that are used when the control unit 303 executes various programs.

Furthermore, the storage unit 301 according to the embodiment stores a second database 301a. The second database 301a has registered therein the total number of pieces of sensor information, received by the GW 30 during the sensor-information acquisition time, described later, and the traffic level in a related manner.

The communication unit 302 is implemented by using a network interface card (a communicator) that performs wireless communication in accordance with a standard, such as Wifi (registered trademark) or BlueTooth (registered trademark). The communication unit 302 performs wireless communication with the node 20 or the server 40. For example, the communication unit 302 receives the sensor information, transmitted from the nodes 20, and also transmits the received sensor information to the server 40. The communication unit 302 is an example of a first communication unit.

The control unit 303 is implemented by using a processor, such as a CPU. The control unit 303 performs overall control of the GW 30. The control unit 303 reads various programs, stored in the storage unit 301, and executes the read programs, thereby performing various processes. For example, the control unit 303 executes the timing-information derivation program to perform the timing-information derivation process.

As illustrated in FIG. 4, if the control unit 303, which executes the timing-information derivation process, is illustrated functionally, the control unit 303 includes a deriving unit 303a.

FIG. 5 is a diagram that illustrates an example of the data structure of the second database 301a according to the embodiment. As illustrated in FIG. 5, the record of the second database 301a has the items "total number of pieces of sensor information" and "traffic level".

The range of the total number of pieces of sensor information, received by the GW 30 during the sensor-information acquisition time, is registered in the item "total number of pieces of sensor information". For example, in the item "total number of pieces of sensor information" of the first record of the second database 301a, illustrated in FIG. 5, the range of equal to or more than 0 and less than 5 is registered as the range of the total number of pieces of sensor information that are received by the GW 30 during the sensor-information acquisition time.

Furthermore, in the item "total number of pieces of sensor information" of the second record of the second database 301a, the range of equal to or more than 5 and less than 10 is registered as the range of the total number of pieces of sensor information that are received by the GW 30 during the sensor-information acquisition time.

Furthermore, in the item "total number of pieces of sensor information" of the third record of the second database 301a, the range of equal to or more than 10 and less than 15 is registered as the range of the total number of pieces of sensor information that are received by the GW 30 during the sensor-information acquisition time.

Furthermore, in the item "total number of pieces of sensor information" of the fourth record of the second database 301a, the range of equal to or more than 15 and less than 20 is registered as the range of the total number of pieces of sensor information that are received by the GW 30 during the sensor-information acquisition time.

Furthermore, in the item "total number of pieces of sensor information" of the fifth record of the second database 301a, the range of equal to or more than 20 is registered as the range of the total number of pieces of sensor information that are received by the GW 30 during the sensor-information acquisition time.

A traffic level is registered in the item "traffic level". The traffic level 1 is registered in the item "traffic level" of the first record of the second database 301a, illustrated in FIG. 5. That is, in the first record of the second database 301a, the traffic level 1 is registered in relation to the range of the total number of pieces of sensor information of equal to or more than 0 and less than 5.

Furthermore, the traffic level 2 is registered in the item "traffic level" of the second record of the second database 301a. That is, in the second record of the second database 301a, the traffic level 2 is registered in relation to the range of the total number of pieces of sensor information of equal to or more than 5 and less than 10.

Furthermore, the traffic level 3 is registered in the item "traffic level" of the third record of the second database 301a. That is, in the third record of the second database 301a, the traffic level 3 is registered in relation to the range of the total number of pieces of sensor information of equal to or more than 10 and less than 15.

Furthermore, the traffic level 4 is registered in the item "traffic level" of the fourth record of the second database 301a. That is, in the fourth record of the second database 301a, the traffic level 4 is registered in relation to the range of the total number of pieces of sensor information of equal to or more than 15 and less than 20.

Moreover, the traffic level 5 is registered in the item "traffic level" of the fifth record of the second database 301a. That is, in the fifth record of the second database 301a, the traffic level 5 is registered in relation to the range of the total number of pieces of sensor information of equal to or more than 20.

Furthermore, the registered contents of the second database 301a are not limited to the contents that are illustrated in FIG. 5. The second database 301a only has to register each of the ranges of the total number of pieces of sensor information and a corresponding traffic level.

Figure 6:
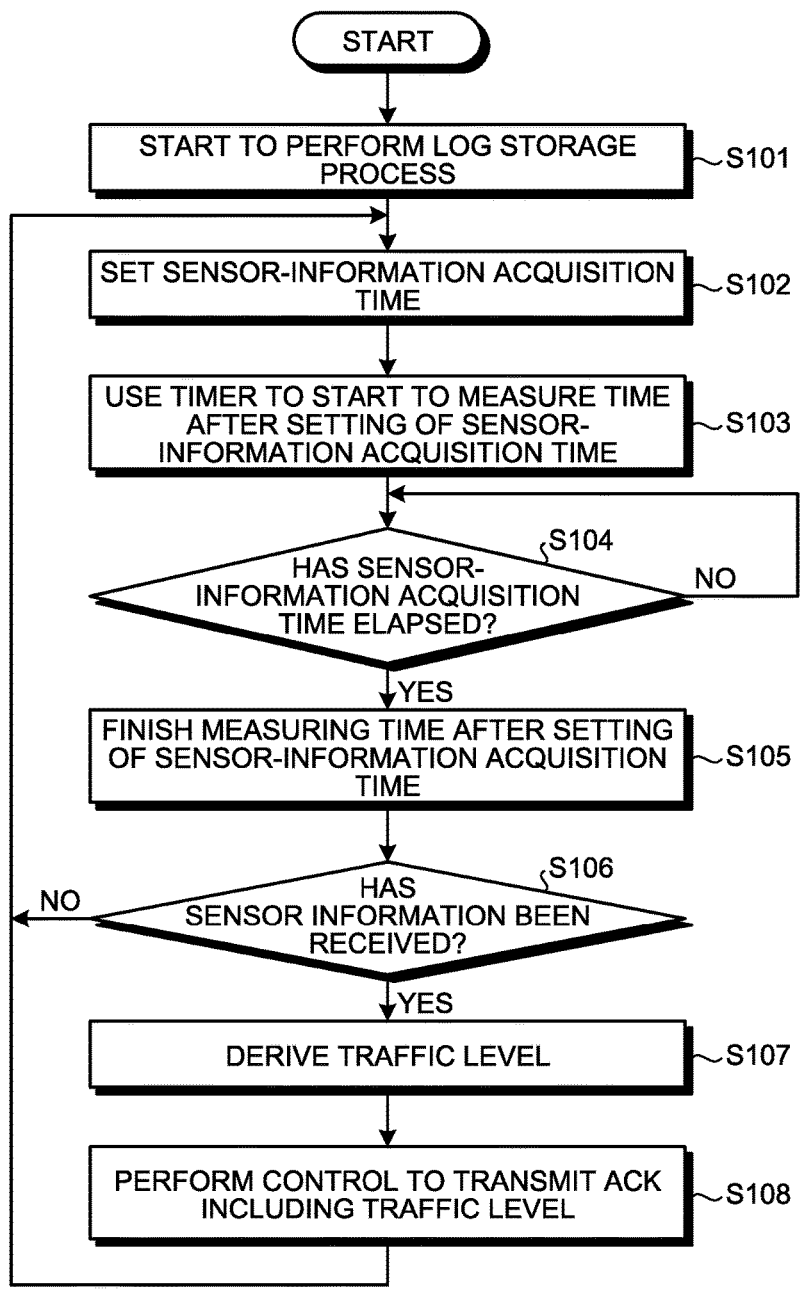
FIG. 6 is a flowchart that illustrates the flow of a timing-information derivation process that is performed by a control unit of the GW according to the embodiment.

Next, with reference to FIG. 6, the timing-information derivation process according to the embodiment is explained. FIG. 6 is a flowchart that illustrates the flow of the timing-information derivation process that is performed by the control unit 303 according to the embodiment. The timing-information derivation process according to the embodiment is performed when electric power is supplied to the control unit 303 from an undepicted power source.

As illustrated in FIG. 6, the deriving unit 303a of the control unit 303 starts to perform the log storage process to store the sensor information from each of the nodes 20 as logs in the storage unit 301 (Step S101). Thus, after Step S101, the received sensor information is stored as a log in the storage unit 301 out of synchronization with the operations at Step S102 to S108.

Then, the deriving unit 303a sets the sensor-information acquisition time (e.g., 20 seconds), which is the time for stand-by at Step S103 that is described later (Step S102).

Then, the deriving unit 303a uses the software timer to start to measure the time after the setting of the sensor-information acquisition time at Step S102 (Step S103).

Then, the deriving unit 303a compares the sensor-information acquisition time, which is set at Step S102, and the time after the sensor-information acquisition time is set, which is started to be measured at Step S103, thereby determining whether the sensor-information acquisition time has elapsed after setting of the sensor-information acquisition time at Step S102 (Step S104).

Here, the time when the sensor-information acquisition time is set is the start point of the sensor-information acquisition time, and the time when the sensor-information acquisition time has elapsed after the start point is the end point of the sensor-information acquisition time. That is, the sensor-information acquisition time is the time from the start point of the sensor-information acquisition time to the end point that follows the start point. The sensor-information acquisition time is an example of a predetermined time period, the start point is an example of a first point, and the end point is an example of a second point.

If it is determined that the sensor-information acquisition time has not elapsed (Step S104: No), the deriving unit 303a makes a determination at Step S104 again. That is, at Step S104, the deriving unit 303a stands by until the sensor-information acquisition time has elapsed.

If it is determined that the sensor-information acquisition time has elapsed (Step S104: Yes), the deriving unit 303a finishes measuring the time after the setting of the sensor-information acquisition time (Step S105).

Then, the deriving unit 303a refers to the memory contents of the storage unit 301 to determine whether the sensor information has been received from the node 20 during the time from the setting of the sensor-information acquisition time at Step S102 to the elapse of the sensor-information acquisition time (Step S106).

If it is determined that the sensor information has not been received (Step S106: No), the deriving unit 303a returns to Step S102 and performs again the process after Step S102.

If it is determined that the sensor information has been received (Step S106: Yes), the deriving unit 303a derives a traffic level (Step S107).

An explanation is given of an example of the method for deriving a traffic level by the deriving unit 303a according to the embodiment. For example, the deriving unit 303a first refers to the memory contents of the storage unit 301 to derive the total number of pieces of sensor information that are received during the time from the setting of the sensor-information acquisition time at Step S102 to the elapse of the sensor-information acquisition time. Then, from all the records of the second database 301a, the deriving unit 303a searches for the record that registers the range of the total number, including the derived total number of pieces of sensor information, in the item "total number of pieces of sensor information". Then, the deriving unit 303a acquires the traffic level, which is registered in the item "traffic level" of the record that is obtained as a result of searching, thereby deriving the traffic level.

Then, the deriving unit 303a includes the derived traffic level in the ACK that is transmitted to the node 20, which is the transmission source of the sensor information that is received during the time from the setting of the sensor-information acquisition time at Step S102 to the elapse of the sensor-information acquisition time, and controls the communication unit 302 so as to transmit the ACK including the traffic level to the node 20 that is the transmission source of the sensor information (Step S108). Thus, the communication unit 302 transmits the ACK including the traffic level to the node 20, which is the transmission source of the sensor information. Then, the deriving unit 303a returns to Step S102 and performs again the process after Step S102. That is, the deriving unit 303a repeatedly performs each operation at Step S102 to S108 many times.

Figure 7:
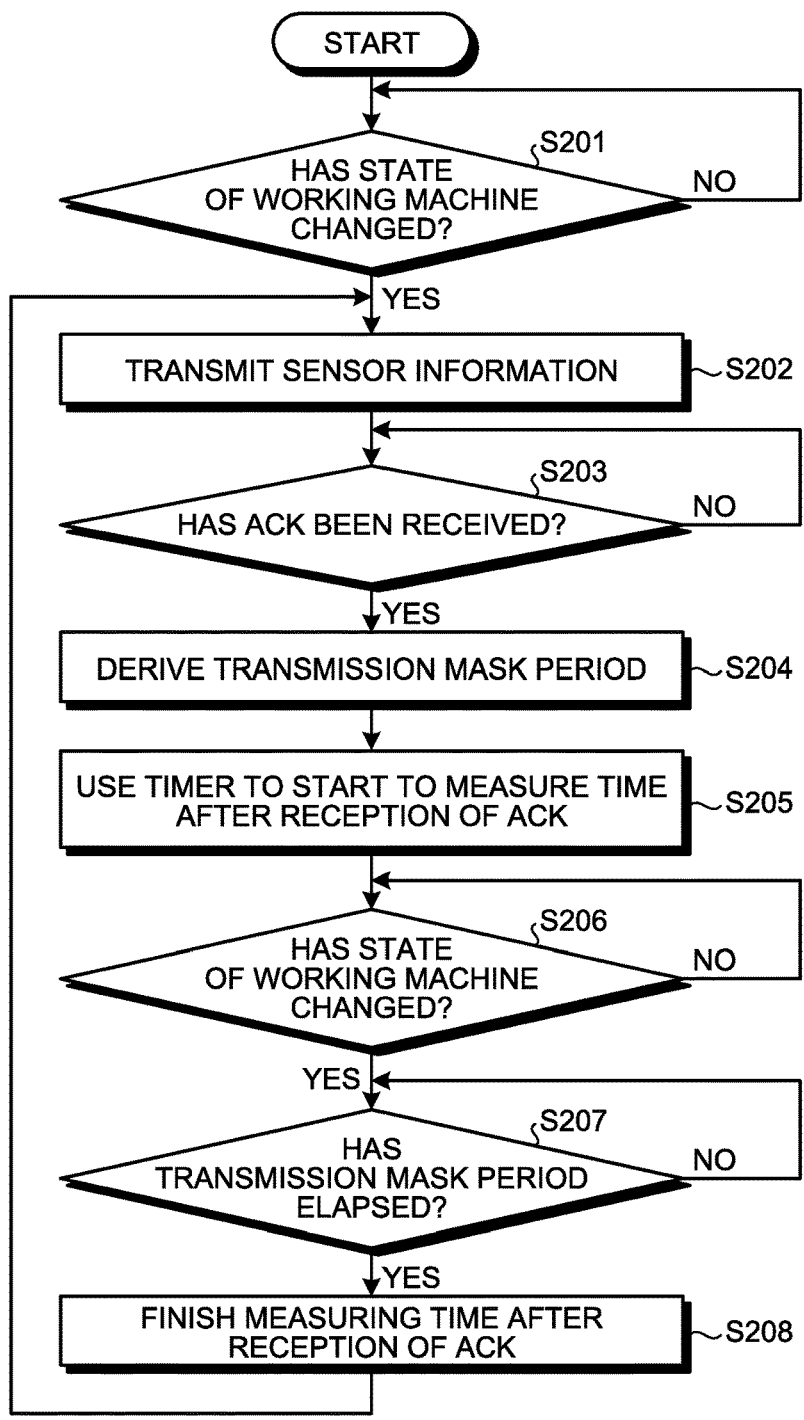
FIG. 7 is a flowchart that illustrates the flow of a sensor-information transmission process that is performed by a control unit of the node according to the embodiment.

Next, with reference to FIG. 7, the sensor-information transmission process is explained. FIG. 7 is a flowchart that illustrates the flow of the sensor-information transmission process that is performed by the control unit 203 according to the embodiment. The sensor-information transmission process is performed when electric power is supplied to the control unit 203 from an undepicted power source.

As illustrated in FIG. 7, the transmission control unit 203a of the control unit 203 determines whether the state of the working machine, notified by the sensor 10, has changed (Step S201). If it is determined that the state of the working machine has not changed (Step S201: No), the transmission control unit 203a makes a determination again at Step S201. That is, at Step S201, the transmission control unit 203a stands by until the state of the working machine changes.

If it is determined that the state of the working machine has changed (Step S201: Yes), the transmission control unit 203a generates the sensor information that indicates the changed state of the working machine and controls the communication unit 202 so as to transmit the generated sensor information to the GW 30 (Step S202). Thus, the communication unit 202 transmits the sensor information to the GW 30.

Then, the transmission control unit 203a determines whether ACK has been received from the GW 30 (Step S203). If it is determined that ACK has not been received (Step S203: No), the transmission control unit 203a makes a determination at S203 again. That is, at Step S203, the transmission control unit 203a stands by until ACK is received.

Furthermore, if ACK is not received although a predetermined time elapses after the sensor information is transmitted to the GW 30, the transmission control unit 203a controls the communication unit 202 so as to transmit the sensor information again. Moreover, if ACK is not received although the sensor information is retransmitted a predetermined number of times, the transmission control unit 203a discards the sensor information and then return to the above-described Step S201.

If it is determined that ACK has been received (Step S203: Yes), the transmission control unit 203a derives a transmission mask period from the received ACK (Step S204). An explanation is given of an example of the method for deriving a transmission mask period by the transmission control unit 203a according to the embodiment. As described above, a traffic level is included in ACK. Therefore, for example, the transmission control unit 203a first acquires the traffic level that is included in the ACK. Then, from all the records of the first database 201a, the transmission control unit 203a searches for the record, the item "traffic level" of which registers the acquired traffic level. Then, the transmission control unit 203a acquires the transmission mask period that is registered in the item "transmission mask period" of the record, which is obtained as a result of searching, thereby deriving the transmission mask period.

Then, the transmission control unit 203a uses the software timer to start to measure the time after reception of the ACK (the time after it is determined that the ACK has been received at Step S203) (Step S205).

Then, the transmission control unit 203a determines whether the state of the working machine, notified by the sensor 10, has changed (Step S206). If it is determined that the state of the working machine has not changed (Step S206: No), the transmission control unit 203a makes a determination at Step S206 again. That is, at Step S206, the transmission control unit 203a stands by until the state of the working machine changes.

If it is determined that the state of the working machine has changed (Step S206: Yes), the transmission control unit 203a compares the transmission mask period, derived at Step S204, and the time after reception of the ACK, which is started to be measured at Step S205, thereby determining whether the transmission mask period has elapsed after reception of the ACK (Step S207).

If it is determined that the transmission mask period has not elapsed (Step S207: No), the transmission control unit 203a makes a determination at Step S207 again. That is, at Step S207, the transmission control unit 203a stands by until the transmission mask period has elapsed.

If it is determined that the transmission mask period has elapsed (Step S207: Yes), the transmission control unit 203a finishes measuring the time after reception of the ACK by using the timer (Step S208). Then, the transmission control unit 203a returns to the above-described Step S202 to generate the sensor information that indicates the changed state of the working machine and controls the communication unit 202 so as to transmit the generated sensor information to the GW 30. Then, the transmission control unit 203a performs again the process after Step S203. That is, the transmission control unit 203a repeatedly performs the operations from Step S202 to S208 many times.

An explanation is given of a case where, for example, before the transmission control unit 203a determines that the state of the working machine has changed at Step S206, the transmission mask period elapses after reception of the ACK. In this case, after it is determined that the state of the working machine has changed at Step S206, the transmission control unit 203a instantly determines that the transmission mask period has elapsed at Step S207 and therefore it instantly proceeds to Step S202. Therefore, after it is determined that the state of the working machine has changed at Step S206, the communication unit 202 instantly transmits the sensor information at Step S202.

Furthermore, if the state of the working machine newly changes during a stand-by at Step S207, the transmission control unit 203a may perform a control so as to generate new sensor information that indicates the changed state of the working machine, queue the sensor information by First-In First-Out (FIFO) method, and sequentially transmit the sensor information, starting from the earlier one.

During the timing-information derivation process according to the above-described embodiment, at the first-time Step S107, the deriving unit 303a derives the traffic level, which is the information related to the transmission timing of the sensor information transmitted after the end point of the sensor-information acquisition time by the node 20, which is included in the nodes 20 and is the transmission source of the sensor information received by the communication unit 302 during the sensor-information acquisition time, on the basis of the total number of pieces of sensor information that are received by the communication unit 302 between the start point of the sensor-information acquisition time, set at the first-time Step S102, and the end point at which the sensor-information acquisition time elapses. Then, at the first-time Step S108, the deriving unit 303a controls the communication unit 302 so as to transmit the ACK including the traffic level to the node 20, which is the transmission source of the sensor information. Thus, the communication unit 302 transmits the ACK including the traffic level to the node 20 that is the transmission source of the sensor information.

Furthermore, during the sensor-information transmission process according to the above-described embodiment, the communication unit 202 transmits the sensor information, transmitted after the end point of the sensor-information acquisition time, at the timing based on the received traffic level.

Here, if N is a natural number, the process performed by the deriving unit 303a and the communication unit 302 may be generalized as described below. For example, at N-time Step S107, the deriving unit 303a derives the traffic level, which is the information related to the transmission timing of the sensor information transmitted after the end point of the sensor-information acquisition time by the node 20, which is included in the nodes 20 and is the transmission source of the sensor information received by the communication unit 302 during the sensor-information acquisition time, on the basis of the total number of pieces of sensor information that are received by the communication unit 302 between the start point of the sensor-information acquisition time, set at N-time Step S102, and the end point at which the sensor-information acquisition time elapses. Then, at N-time Step S108, the communication unit 302 transmits the ACK including the traffic level to the node 20, which is the transmission source of the sensor information.

Furthermore, during the timing-information derivation process, at N-time Step S108, the communication unit 302 transmits the ACK including the traffic level to the node 20, which is the transmission source of the sensor information, after the end point of the sensor-information acquisition time that is set at N-time Step S102.

Here, there is a case where pieces of sensor information are concurrently transmitted from the nodes 20 to the GW 30 and the traffic becomes large in the mesh networks 91, 92. In such a case, the GW 30 sequentially transmits ACK to the nodes 20 one by one. Therefore, there are variations in the timings in which the nodes 20 receive ACK. Thus, although the transmission mask periods, derived by the nodes 20, are the same, there are variations in the transmission timings of multiple pieces of sensor information, transmitted by the nodes 20. As a result, the nodes 20 transmit the subsequent pieces of sensor information at different timings. Therefore, with the communication system 1 according to the embodiment, it is possible to prevent the occurrence of a situation where many pieces of sensor information are concurrently transmitted from the large number of the nodes 20 to the GW 30.

As described above, with the GW 30 according to the embodiment, the transmission interval of the sensor information of the node 20 is controlled in accordance with the derived traffic level; thus, the occurrence of collisions, buffer overflow, or the like, may be prevented. Thus, with the GW 30 according to the embodiment, it is possible to prevent the occurrence of a situation where the sensor information cannot be properly received due to the occurrence of collisions, buffer overflow, or the like, or transmission of ACK is delayed.

Thus, with the GW 30 according to the embodiment, the sensor information may be received definitely and efficiently.

Furthermore, with the GW 30 according to the embodiment, instead of transmitting the ACK each time the sensor information is received, the ACK is transmitted after the sensor-information acquisition time elapses; thus, it is possible to prevent an increase in the processing loads on the GW 30.

Furthermore, with the node 20 according to the embodiment, the sensor information is transmitted after the ACK is received; therefore, it is possible to further ensure that the GW 30 receives the sensor information. As a result, the reliability of communication between the node 20 and the GW 30 is increased.

First Modified Example of the Embodiment

Although an explanation is given in the above-described embodiment of an example where the GW 30 transmits the ACK including the traffic level after the end point of the sensor-information acquisition time; however, the GW 30 may transmit the ACK including the traffic level each time the sensor information is received. Therefore, this configuration is explained as a first modified example of the embodiment.

Figures 8, 9:
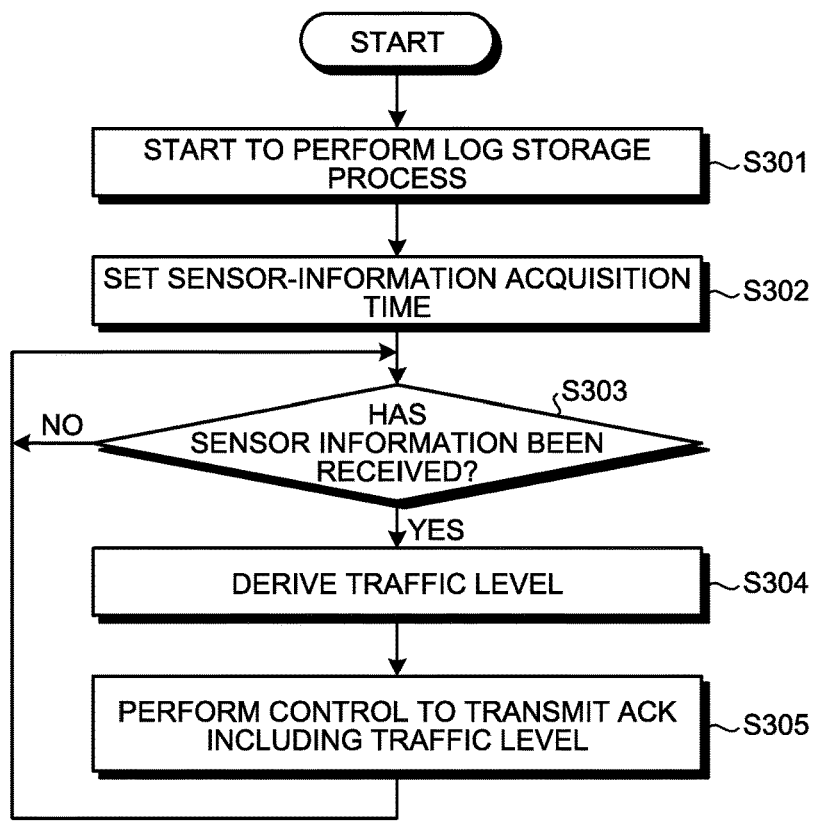
FIG. 8 is a flowchart that illustrates the flow of the timing-information derivation process that is performed by the control unit according to a first modified example of the embodiment.
FIG. 9 is a diagram that illustrates an example of the data structure of a third database according to a second modified example.

FIG. 8 is a flowchart that illustrates the flow of the timing-information derivation process that is performed by the control unit 303 according to the first modified example of the embodiment. The timing-information derivation process according to the first modified example is performed when electric power is supplied to the control unit 303 from an undepicted power source.

As illustrated in FIG. 8, the deriving unit 303a of the control unit 303 according to the first modified example starts to perform the log storage process to store the sensor information from each of the nodes 20 as logs in the storage unit 301 (Step S301). Thus, after Step S301, the received sensor information is stored as a log in the storage unit 301 out of synchronization with the operations at Step S302 to S305.

Then, the deriving unit 303a sets the sensor-information acquisition time (e.g., 20 seconds) (Step S302). Then, the deriving unit 303a determines whether the sensor information has been received from the node 20 (Step S303).

If it is determined that the sensor information has not been received (Step S303: No), the deriving unit 303a makes a determination at Step S303 again. That is, at Step S303, the deriving unit 303a stands by until the sensor information is received.

If it is determined that the sensor information has been received (Step S303: Yes), the deriving unit 303a derives the traffic level (Step S304).

An explanation is given of an example of the method for deriving the traffic level by the deriving unit 303a according to the first modified example. For example, the deriving unit 303a first refers to the memory contents of the storage unit 301 to derive the total number of pieces of sensor information that are received during the time period between the time when the sensor information is received (the time when it is determined that the sensor information has been received at Step S303) and the time back to the past, corresponding to the sensor-information acquisition time. Then, from all the records of the second database 301a, the deriving unit 303a searches for the record that registers the range of the total number, including the derived total number of pieces of sensor information, in the item "total number of pieces of sensor information". Then, the deriving unit 303a acquires the traffic level, which is registered in the item "traffic level" of the record that is obtained as a result of searching, thereby deriving the traffic level.

Then, the deriving unit 303a includes the derived traffic level in the ACK that is transmitted to the node 20, which is the transmission source of the sensor information that is determined to have been received at Step S303, and controls the communication unit 302 so as to transmit the ACK including the traffic level to the node 20 that is the transmission source of the sensor information (Step S305). Thus, the communication unit 302 transmits the ACK including the traffic level to the node 20, which is the transmission source of the sensor information. Then, the deriving unit 303a returns to Step S303 and performs again the process after Step S303. That is, the deriving unit 303a repeatedly performs each operation at Step S303 to S305 many times.

During the timing-information derivation process according to the first modified example that is described above, each time the communication unit 302 receives the sensor information, transmitted from each of the nodes 20, the deriving unit 303a derives a traffic level on the basis of the total number of pieces of sensor information that are received by the communication unit 302 during the sensor-information acquisition time that precedes the reception timing of the received sensor information. Then, each time the deriving unit 303a derives the traffic level, the communication unit 302 transmits the ACK including the traffic level to the node 20, which is the transmission source of the sensor information.

As described above, the GW 30 according to the first modified example transmits the ACK including the traffic level to the node 20 each time the sensor information is received. Therefore, with the GW 30 according to the first modified example, the traffic level is promptly notified to the node 20 after the sensor information is received; thus, the transmission interval of the sensor information by the node 20 may be controlled promptly.

Second Modified Example of the Embodiment

In the embodiment and the first modified example, described above, an explanation is given of an example where the GW 30 derives a traffic level and transmits the ACK including the derived traffic level to the node 20. However, the GW 30 may derive a transmission mask period and transmit the ACK including the derived transmission mask period to the node 20. Therefore, this configuration is explained as a second modified example of the embodiment.

FIG. 9 is a diagram that illustrates an example of the data structure of a third database 301b according to a second modified example. According to the second modified example, the storage unit 201 of the node 20 does not store the first database 201a, and the storage unit 301 of the GW 30 stores the third database 301b instead of the second database 301a.

As illustrated in FIG. 9, records of the third database 301b contain the items "total number of pieces of sensor information" and "transmission mask period".

The range of the total number of pieces of sensor information that are received by the GW 30 during the sensor-information acquisition time is registered in the item "total number of pieces of sensor information". For example, in the item "total number of pieces of sensor information" of the first record of the third database 301b, illustrated in FIG. 9, the range of equal to or more than 0 and less than 5 is registered as the range of the total number of pieces of sensor information that are received by the GW 30 during the sensor-information acquisition time.

Furthermore, in the item "total number of pieces of sensor information" of the second record of the third database 301b, the range of equal to or more than 5 and less than 10 is registered as the range of the total number of pieces of sensor information that are received by the GW 30 during the sensor-information acquisition time.

Furthermore, in the item "total number of pieces of sensor information" of the third record of the third database 301b, the range of equal to or more than 10 and less than 15 is registered as the range of the total number of pieces of sensor information that are received by the GW 30 during the sensor-information acquisition time.

Furthermore, in the item "total number of pieces of sensor information" of the fourth record of the third database 301b, the range of equal to or more than 15 and less than 20 is registered as the range of the total number of pieces of sensor information that are received by the GW 30 during the sensor-information acquisition time.

Furthermore, in the item "total number of pieces of sensor information" of the fifth record of the third database 301b, the range of equal to or more than 20 is registered as the range of the total number of pieces of sensor information that are received by the GW 30 during the sensor-information acquisition time.

A transmission mask period is registered in the item "transmission mask period". Here, the transmission mask period is an example of the timing information. 1 second is registered in the item "transmission mask period" of the first record of the third database 301b, illustrated in FIG. 9. That is, the transmission mask period of 1 second is registered in the first record of the third database 301b in relation to the range of the total number of pieces of sensor information of equal to or more than 0 and less than 5.

Furthermore, 5 seconds is registered in the item "transmission mask period" of the second record of the third database 301b. That is, the transmission mask period of 5 seconds is registered in the second record of the third database 301b in relation to the range of the total number of pieces of sensor information of equal to or more than 5 and less than 10.

Furthermore, 20 seconds is registered in the item "transmission mask period" of the third record of the third database 301b. That is, the transmission mask period of 20 seconds is registered in the third record of the third database 301b in relation to the range of the total number of pieces of sensor information of equal to or more than 10 and less than 15.

Furthermore, 40 seconds is registered in the item "transmission mask period" of the fourth record of the third database 301b. That is, the transmission mask period of 40 seconds is registered in the fourth record of the third database 301b in relation to the range of the total number of pieces of sensor information of equal to or more than 15 and less than 20.

Moreover, 60 seconds is registered in the item "transmission mask period" of the fifth record of the third database 301b. That is, the transmission mask period of 60 seconds is registered in the fifth record of the third database 301b in relation to the range of the total number of pieces of sensor information of equal to or more than 20.

Figure 10:
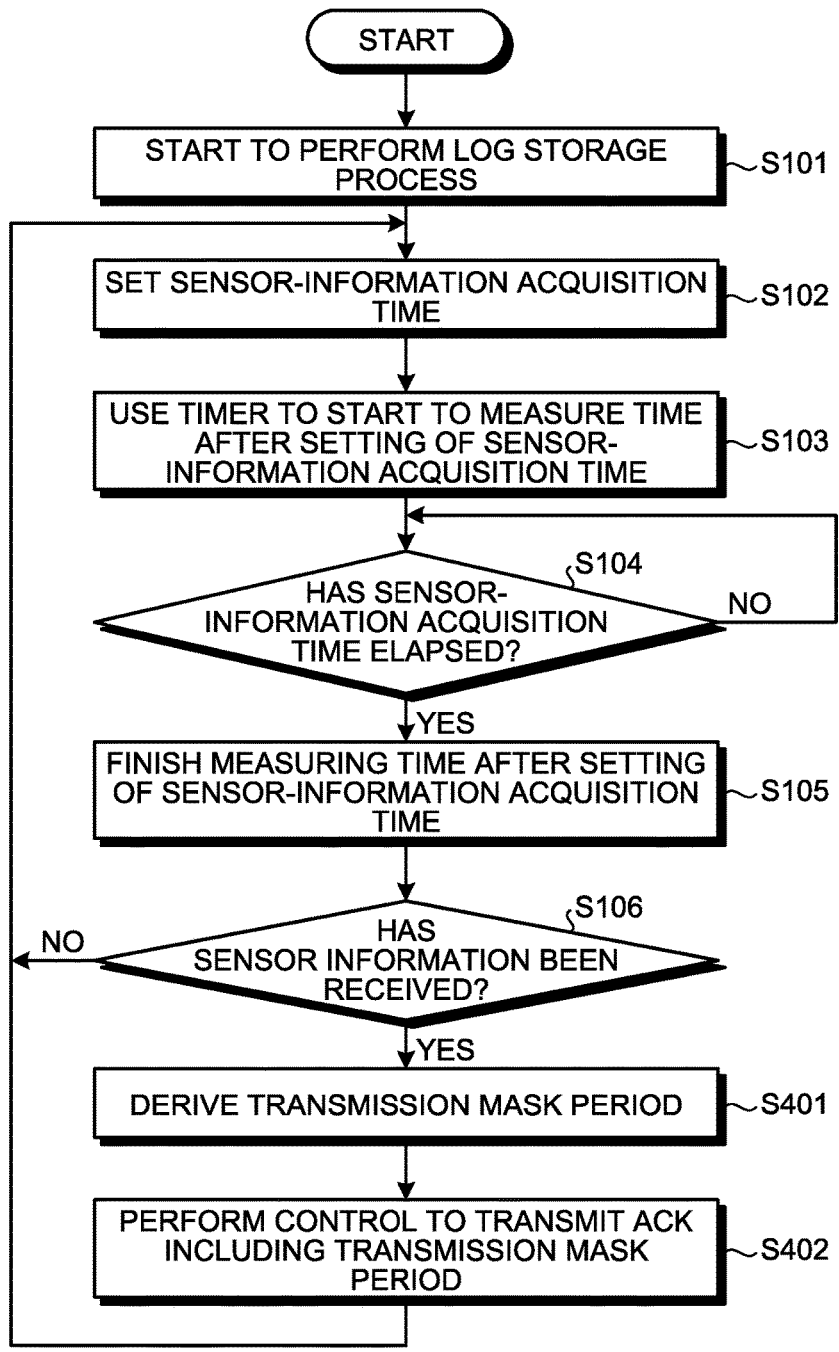
FIG. 10 is a flowchart that illustrates the flow of the timing-information derivation process that is performed by the control unit of the GW according to the second modified example.

Next, with reference to FIG. 10, the timing-information derivation process according to the second modified example is explained. FIG. 10 is a flowchart that illustrates the flow of the timing-information derivation process that is performed by the control unit 303 of the GW 30 according to the second modified example. The timing-information derivation process according to the second modified example is performed when electric power is supplied to the control unit 303 from an undepicted power source.

As the operations at Step S101 to S106 during the timing-information derivation process according to the second modified example, illustrated in FIG. 10, are the same as the operations at Step S101 to S106 during the timing-information derivation process according to the embodiment, illustrated in FIG. 6, explanations are omitted.

As illustrated in FIG. 10, if it is determined that the sensor information has been received (Step S106: Yes), the deriving unit 303a of the control unit 303 according to the second modified example derives a transmission mask period (Step S401).

An explanation is given of an example of the method for deriving the transmission mask period by the deriving unit 303a according to the second modified example. For example, the deriving unit 303a first refers to the memory contents of the storage unit 301 to derive the total number of pieces of sensor information that are received during the time from the setting of the sensor-information acquisition time at Step S102 to the elapse of the sensor-information acquisition time. Then, from all the records of the third database 301b, the deriving unit 303a searches for the record that registers the range of the total number, including the derived total number of pieces of sensor information, in the item "total number of pieces of sensor information". Then, the deriving unit 303a acquires the transmission mask period, which is registered in the item "transmission mask period" of the record that is obtained as a result of searching, thereby deriving the transmission mask period.

Furthermore, the deriving unit 303a includes the derived transmission mask period in the ACK that is transmitted to the node 20, which is the transmission source of the sensor information that is received during the time from the setting of the sensor-information acquisition time at Step S102 to the elapse of the sensor-information acquisition time, and controls the communication unit 302 so as to transmit the ACK including the transmission mask period to the node 20 that is the transmission source of the sensor information (Step S402). Thus, the communication unit 302 transmits the ACK including the transmission mask period to the node 20, which is the transmission source of the sensor information. Then, the deriving unit 303a returns to Step S102 and performs again the process after Step S102. That is, the deriving unit 303a repeatedly performs the operations at Step S102 to S106, S401, and S402 many times.

Figure 11:
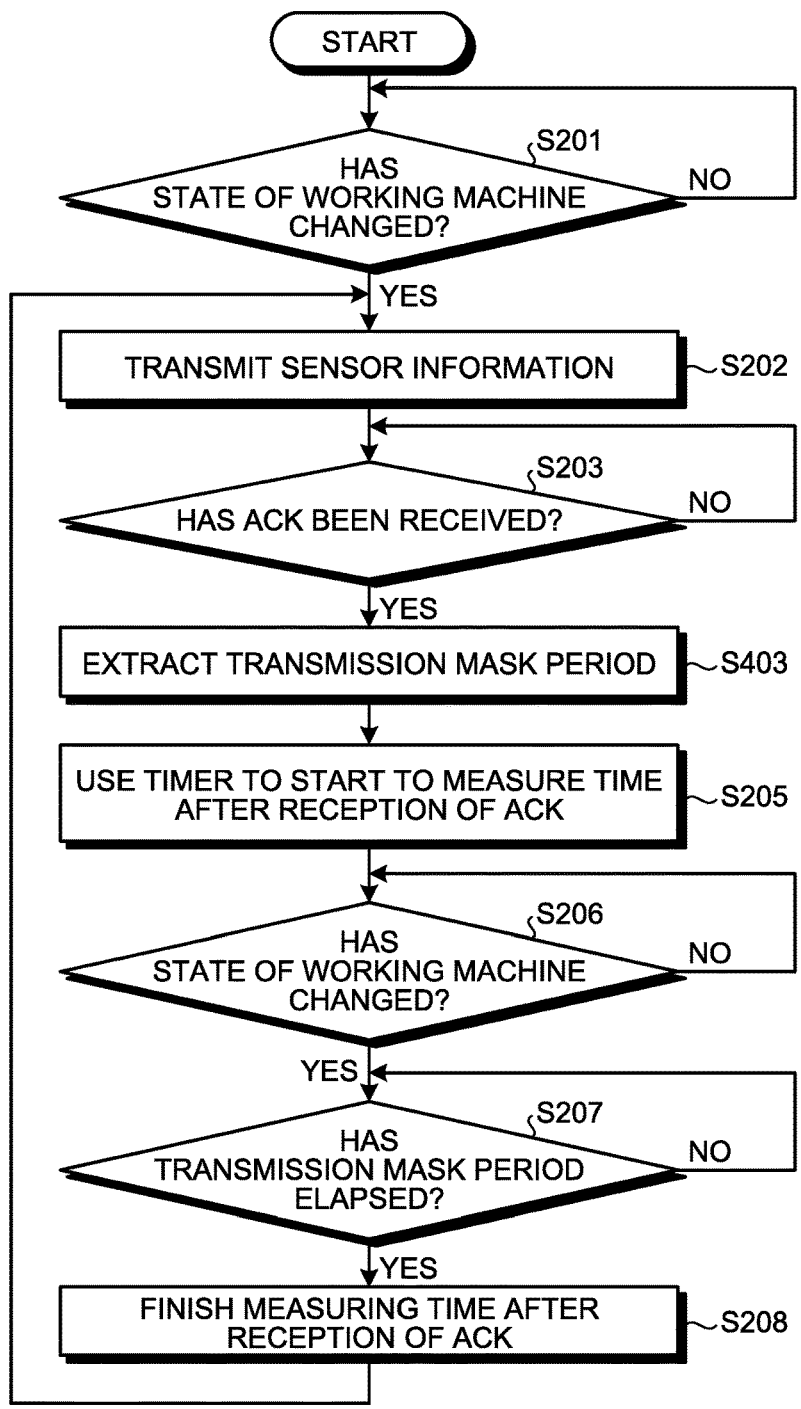
FIG. 11 is a flowchart that illustrates the flow of the sensor-information transmission process that is performed by the control unit of the node according to the second modified example.

Next, with reference to FIG. 11, the sensor-information transmission process according to the second modified example is explained. FIG. 11 is a flowchart that illustrates the flow of the sensor-information transmission process that is performed by the control unit 203 of the node 20 according to the second modified example. The sensor-information transmission process according to the second modified example is performed when electric power is supplied to the control unit 203 from an undepicted power source.

As the operations at Step S201 to S203 and S205 to S208 during the sensor-information transmission process according to the second modified example, illustrated in FIG. 11, are the same as the operations at Step S201 to S203 and S205 to S208 during the sensor-information transmission process according to the embodiment, illustrated in FIG. 7, explanations are omitted.

As illustrated in FIG. 11, if the transmission control unit 203a of the control unit 203 according to the second modified example determines that the ACK has been received (Step S203: Yes), the transmission control unit 203a extracts the transmission mask period, included in the ACK, from the received ACK (Step S403).

During the timing-information derivation process according to the above-described second modified example, at the first-time Step S401, the deriving unit 303a derives the transmission mask period, which is the information related to the transmission timing of the sensor information transmitted after the end point of the sensor-information acquisition time by the node 20, which is included in the nodes 20 and is the transmission source of the sensor information received by the communication unit 302 during the sensor-information acquisition time, on the basis of the total number of pieces of sensor information that are received by the communication unit 302 between the start point of the sensor-information acquisition time, set at the first-time Step S102, and the end point in which the sensor-information acquisition time elapses. Then, at the first-time Step S402, the deriving unit 303a controls the communication unit 302 so as to transmit the ACK including the transmission mask period to the node 20, which is the transmission source of the sensor information. Thus, the communication unit 302 transmits the ACK including the transmission mask period to the node 20 that is the transmission source of the sensor information.

The process performed by the deriving unit 303*a* and the communication unit 302 may be generalized as described below. For example, at N-time Step S401, the deriving unit 303*a* derives the transmission mask period, which is the information related to the transmission timing of the sensor information transmitted after the end point of the sensor-information acquisition time by the node 20, which is included in the nodes 20 and is the transmission source of the sensor information received by the communication unit 302 during the sensor-information acquisition time, on the basis of the total number of pieces of sensor information that are received by the communication unit 302 between the start point of the sensor-information acquisition time, set at N-time Step S102, and the end point. Then, at N-time Step S402, the communication unit 302 transmits the ACK including the transmission mask period to the node 20, which is the transmission source of the sensor information.

Furthermore, during the timing-information derivation process, at N-time Step S402, the communication unit 302 transmits the ACK including the transmission mask period to the node 20, which is the transmission source of the sensor information, after the end point of the sensor-information acquisition time that is set at N-time Step S102.

With the GW 30 according to the second modified example, the sensor information may be received definitely and efficiently in the same manner as the GW 30 according to the embodiment.

In the embodiment, the first modified example, and the second modified example, described above, an explanation is given of an example where the deriving unit 303*a* of the GW 30 controls the communication unit 302 so as to transmit the ACK including the traffic level or the transmission mask period to the node 20 that is the transmission source of the sensor information. That is, an explanation is given of an example where the communication unit 302 transmits the ACK including the traffic level or the transmission mask period to the node 20 that is the transmission source of the sensor information.

However, the deriving unit 303*a* of the GW 30 may control the communication unit 302 so as to transmit the ACK including the traffic level or the transmission mask period to at least one of the nodes 20. That is, the communication unit 302 may transmit the ACK including the traffic level or the transmission mask period to at least one of the nodes 20. In this case, the communication unit 202 of at least one of the nodes 20 transmits the sensor information, which is transmitted after the end point of the sensor-information acquisition time, at the timing based on the derived traffic level or transmission mask period.

For example, the deriving unit 303*a* may control the communication unit 302 so as to transmit the ACK including the traffic level or the transmission mask period to all the nodes 20 (the multiple nodes 20) that are capable of communicating with the GW 30. That is, the communication unit 302 may transmit the ACK including the traffic level or the transmission mask period to all the nodes 20 that are capable of communicating with the GW 30.

Furthermore, in the embodiment, the first modified example, and the second modified example, described above, an explanation is given of an example where the above-described technology is applied to the communication system in which the pieces of sensor information of the nodes are concentrated in the server; however, the above-described technology may be applied to other systems.

According to an aspect of the present invention, information may be received definitely and efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system comprising:
   a plurality of communication terminals;
   a server; and
   a relay device, wherein the relay device comprises:
   a memory; and
   a processor coupled to the memory, wherein the processor executes a process comprising:
   receiving information, transmitted from the communication terminals;
   transferring the received information to the server;
   deriving, in accordance with a total number of pieces of information received in a time period between a first point and a second point in which a predetermined time measured by a timer has elapsed from the first point, timing information for transmission of information transmitted after the second point by the communication terminals that transmitted the information during the time period among the communication terminals; and
   transmitting the timing information sequentially to each of the communication terminals that transmitted the information during the time period one by one, and
   each of the plurality of communication terminals comprises:
   a memory; and
   a processor coupled to the memory, wherein the processor executes a process comprising:
   transmitting first information to the relay device;
   receiving the timing information in a different timing, the timing information transmitted sequentially to each of the communication terminals one by one in response to the transmitted first information; and
   transmitting second information after a wait time determined by the timing information has elapsed from the time point of receiving the timing information, the wait time being measured by a communication terminal timer.

2. The communication system according to claim 1, wherein
   each time the processor of the relay device receives information that is transmitted from each of the communication terminals, the processor of the relay device derives the timing information in accordance with a total number of pieces of information that are received during the measured time period that precedes a reception timing of the information, and
   each time the processor of the relay device derives the timing information, the processor of the relay device transmits the timing information to each of the communication terminals that transmitted the information during the time period.

3. The communication system according to claim 1, wherein the processor of the relay device derives, as the timing information, a traffic level during a communication with the communication terminals in accordance with the total number of pieces of information that are received during the measured time period, and the processor of the communication terminal further executes a process comprising determining the wait time based on the received traffic level.

4. The communication system according to claim 1, wherein the processor of the relay device derives, as the timing information, the wait time in accordance with the total number of pieces of information that are received during the measured time period.

5. The communication system according to claim 3, wherein the processor of the relay device derives the traffic level by referring to a first table that registers therein the traffic level and the total number of pieces of information that are received during the measured time period in a related manner.

6. The communication system according to claim 4, wherein the processor of the relay device derives the wait time by referring to a second table that registers therein the traffic level and the wait time in a related manner.

\* \* \* \* \*